(12) United States Patent
Nakahata et al.

(10) Patent No.: US 9,469,005 B2
(45) Date of Patent: Oct. 18, 2016

(54) WORKPIECE CONVEYOR AND MACHINE TOOL

(71) Applicant: MURATA MACHINERY, LTD., Kyoto-shi, Kyoto (JP)

(72) Inventors: Noriyuki Nakahata, Inuyama (JP); Osamu Matsuno, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 14/798,612

(22) Filed: Jul. 14, 2015

(65) Prior Publication Data
US 2016/0039062 A1 Feb. 11, 2016

(30) Foreign Application Priority Data

Aug. 8, 2014 (JP) .................... 2014-162265

(51) Int. Cl.
| | |
|---|---|
| *B23B 13/02* | (2006.01) |
| *B23B 13/04* | (2006.01) |
| *B23Q 7/04* | (2006.01) |
| *B23Q 1/62* | (2006.01) |
| *B25J 5/04* | (2006.01) |
| *B25J 9/02* | (2006.01) |

(52) U.S. Cl.
CPC ............ *B23Q 7/04* (2013.01); *B23Q 1/626* (2013.01); *B25J 5/04* (2013.01); *B25J 9/026* (2013.01); *B23B 13/02* (2013.01); *B23B 13/04* (2013.01)

(58) Field of Classification Search
CPC ....... B23B 13/02; B23B 13/04; B23B 13/10; B23Q 7/04; B23Q 7/048; B23Q 7/10; B23Q 1/626; B25J 5/04; B25J 9/026; Y10T 82/2514; Y10T 82/2516; Y10T 82/2518; Y10T 82/2521

USPC .......................... 414/749.1, 749.4
See application file for complete search history.

(56) References Cited

U.S. PATENT DOCUMENTS

| | | | |
|---|---|---|---|
| 3,255,893 A * | 6/1966 | Hainer ................... | B25J 5/04 414/728 |
| 8,920,108 B2 * | 12/2014 | Naumann .............. | B21D 43/05 414/226.05 |
| 2008/0181759 A1 * | 7/2008 | Gaegauf ................. | B23Q 7/04 414/751.1 |

(Continued)

FOREIGN PATENT DOCUMENTS

| | | | | |
|---|---|---|---|---|
| DE | 10158194 A1 * | 6/2003 | ............... | B23Q 7/04 |
| EP | 0076231 A2 * | 4/1983 | ............... | B25J 9/026 |
| EP | 0087996 B1 * | 10/1985 | ............... | B23Q 7/04 |

(Continued)

*Primary Examiner* — Sunil K Singh
*Assistant Examiner* — Ryan Rufo
(74) *Attorney, Agent, or Firm* — Keating & Bennett, LLP (57) ABSTRACT

A weight of a movable body is reduced by using two guides, smooth movement of the movable body is ensured, a decrease in life of the guides is prevented, and a workload during installation of the guides is reduced. A workpiece conveyor that conveys a workpiece includes chucks that hold a workpiece, and a movable body that supports the chucks and is movable in an X direction along first and second guides, which are disposed in parallel or substantially parallel spaced apart from each other, and the movable body includes a first structure guided by the first guide, a second structure guided by the second guide, and a joint that is provided between the first structure and the second structure, and allows one of the first structure and the second structure to swing with respect to the other about an axis of a swing shaft set parallel or substantially parallel to the X direction.

9 Claims, 7 Drawing Sheets

(56) References Cited

U.S. PATENT DOCUMENTS

2010/0282037 A1* 11/2010 Fujimoto .................. B23B 3/30
    82/121
2015/0117990 A1* 4/2015 Lu ............................ B25J 9/026
    414/226.05

FOREIGN PATENT DOCUMENTS

| EP | 1329284 A2 * | 7/2003 | ............... B23Q 7/04 |
| JP | 02-028053 A | 1/1990 | |
| JP | 2004-216504 A | 8/2004 | |
| WO | WO 2013/031375 A1 * | 3/2013 | ............... B23Q 7/04 |

* cited by examiner

WORKPIECE CONVEYOR AND MACHINE TOOL

BACKGROUND OF THE INVENTION

1. Field of the Invention

The present invention relates to a workpiece conveyor and a machine tool.

2. Description of the Related Art

A lathe that is a machine tool may include a workpiece conveyor for conveying a workpiece between a spindle that holds the workpiece to be processed and a workpiece loading/unloader. Such a known workpiece conveyor includes a chuck that holds the workpiece and a movable body that holds the chuck and moves (refer to Japanese Unexamined Patent Publication No. 2004-216504, for example). In the workpiece conveyor in Japanese Unexamined Patent Publication No. 2004-216504, the movable body and the chuck move along one linear guide.

When one guide supports the movable body, the movable body overhangs the guide and thus, the movable body is required to have enough stiffness to prevent deformation. For this reason, the movable body becomes heavy, obstructing high-speed movement. Thus, Japanese Unexamined Patent Publication No. 2004-216504 proposes that the movable body is guided by two guides spaced apart from each other in parallel, rather than with one guide. With this structure, the movable body extends across the two guides. However, with the structure using two guides, each guide and the movable body may receive a load generated by the movement of the movable body due to amounting error between the guides in height or distance, disadvantageously limiting smooth movement of the movable body and shortening the life of the guides. Although the two guides can be positioned with respect to a frame with high accuracy, bending of the frame and the like need to be considered, which requires a large workload during installation of the guides.

SUMMARY OF THE INVENTION

In consideration of the above-mentioned situation, preferred embodiments of the present invention provide a workpiece conveyor and a machine tool that reduce a weight of a movable body by using two guides, ensure smooth movement of the movable body, prevent a decrease in life of the guides, and reduce a workload during installation of the guides.

A workpiece conveyor according to a preferred embodiment of the present invention is a workpiece conveyor for conveying a workpiece, the workpiece conveyor including a chuck that holds the workpiece, and a movable body that supports the chuck, and is movable in a first direction along a first guide and a second guide, the guides disposed in parallel or substantially in parallel spaced apart from each other, wherein the movable body includes a first structure guided by the first guide, a second structure guided by the second guide, and a joint that is provided between the first structure and the second structure, and allows one of the first structure and the second structure to swing with respect to the other about an axis of a swing shaft parallel or substantially parallel to the first direction.

The first structure may be guided in the first direction by the first guide while being restricted from rotating about the axis parallel or substantially parallel to the first direction, and the second structure may be swingable about the axis of the swing shaft with respect to the first structure.

The first structure may include an elevator in the first direction. The second guide may include a protruding piece that extends over a whole length of the second guide and protrudes toward the first guide, and the second structure may include a pair of rollers that sandwich the protruding piece. The swing shaft of the joint may be disposed such that a distance to the first guide is smaller than a distance to the second guide. The first direction may be set along a horizontal plane, the second structure may include a slider that moves in a second direction, the second direction crossing the first direction and set along the horizontal plane, and an elevator that is supported by the slider and is movable in a third direction vertical to the horizontal plane, and the chuck may be disposed below the elevator. The first guide may have a higher strength than the second guide. The chuck may include a chuck jaw that is able to grip the workpiece, and an elastic member that pushes out the workpiece when the gripping by the chuck jaw is released.

A machine tool according to a preferred embodiment of the present invention includes a workpiece conveyor that conveys a workpiece to a spindle, and uses the above-mentioned workpiece conveyor as the workpiece conveyor.

According to various preferred embodiments of the present invention, by using the two guides, i.e., the first guide and the second guide, a movable body having a lower stiffness is able to be used as compared to the case of using one guide, and the weight of the movable body is able to be significantly reduced. Even in the case where the first guide is different from the second guide in height (vertical position) or distance therebetween, when the movable body moves in the first direction, at the joint, the first structure and the second structure swing about the axis of the swing shaft so as to follow the first guide and the second guide. The swinging of the first structure and the second structure reduces loads on the movable body, the first guide, and the second guide. Because the loads on the first guide and the second guide are reduced by the swinging of the first structure and the second structure, it is not necessary to position the first guide and the second guide with high accuracy. Thus, even when the two guides, i.e., the first guide and the second guide are used, it is possible to ensure smooth movement of the movable body, prevent a decrease in the life of the guides, and reduce a workload during installation of the guides.

In the workpiece conveyor in which the first structure is guided in the first direction by the first guide while being restricted from rotating about the axis parallel or substantially parallel to the first direction, and the second structure is able to swing about the axis of the swing shaft with respect to the first structure, the movable body is stably moved. In the workpiece conveyor in which the first structure includes the driver that moves in the first direction, the movement in the first direction is stably performed. In the workpiece conveyor in which the second guide includes the protruding piece that extends over a whole length of the second guide and protrudes toward the first guide, and the second structure includes the pair of rollers that sandwich the protruding piece, displacement in the direction in which the protruding piece is sandwiched is prevented. In the workpiece conveyor in which the swing shaft of the joint is disposed such that a distance to the first guide is smaller than a distance to the second guide, the inclination caused when the second structure swings is significantly reduced. In the workpiece conveyor in which the first direction is set along the horizontal plane, the second structure includes a slider that moves in the second direction, the second direction crossing the first direction and set along the horizontal plane, and the elevator that is supported by the slider and is movable in a third direction vertical to the horizontal plane, and the chuck is disposed below the elevator, an increase in loads on the first guide and the second guide in the third direction in which the elevator moves is prevented. In the workpiece conveyor in which the first guide has a higher strength than the second guide, the first structure is stably supported by the first guide even when the first structure is designed to be heavier than the second structure. In this case, a stable configuration is achieved because the light-weight second structure swings. In the workpiece conveyor in which the chuck includes the chuck jaw adapted to grip the workpiece, and the elastic member that pushes out the workpiece when the gripping by the chuck jaw is released, even when the chuck is inclined by the swinging of the second structure, conveyance of the inclined workpiece is prevented.

According to various preferred embodiments of the present invention, by using the workpiece conveyor that prevents a decrease in the life of the first guide and the second guide, and reduces a workload of assembly, the accuracy of conveying the workpiece is stabilized to obtain a machine tool that is able to be manufactured at low cost.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the drawings. However, the present invention is not limited thereto. In the drawings, for convenience of description of the preferred embodiments, components are scaled as appropriate, for example, by partial enlargement or exaggeration. In each of the following figures, directions in the figure are described using an XYZ coordinate system. In the XYZ coordinate system, a plane parallel or substantially parallel to the horizontal plane is defined as an XZ plane. A direction parallel or substantially parallel to the XZ plane is defined as a Z direction, and a direction perpendicular or substantially perpendicular to the Z direction is defined as an X direction. The direction vertical to the XZ plane is defined as a Y direction. In each of the X direction, the Y direction, and the Z direction, the direction indicated by an arrow in the figure is a +direction, and the opposite direction is a −direction.

First Preferred Embodiment

Figure 1:
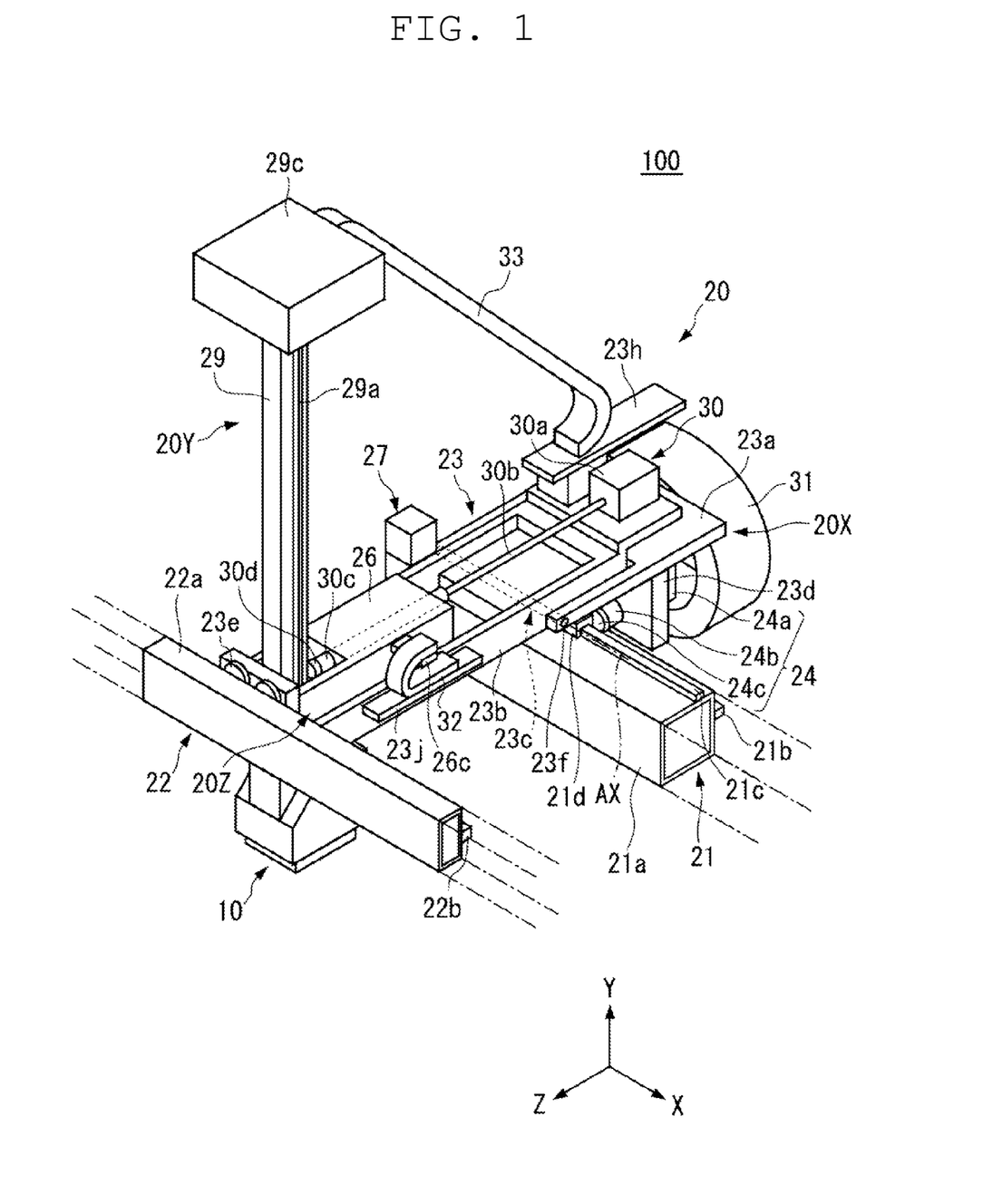
FIG. 1 is a perspective view illustrating an example of a workpiece conveyor according to a first preferred embodiment of the present invention.
Figure 2:
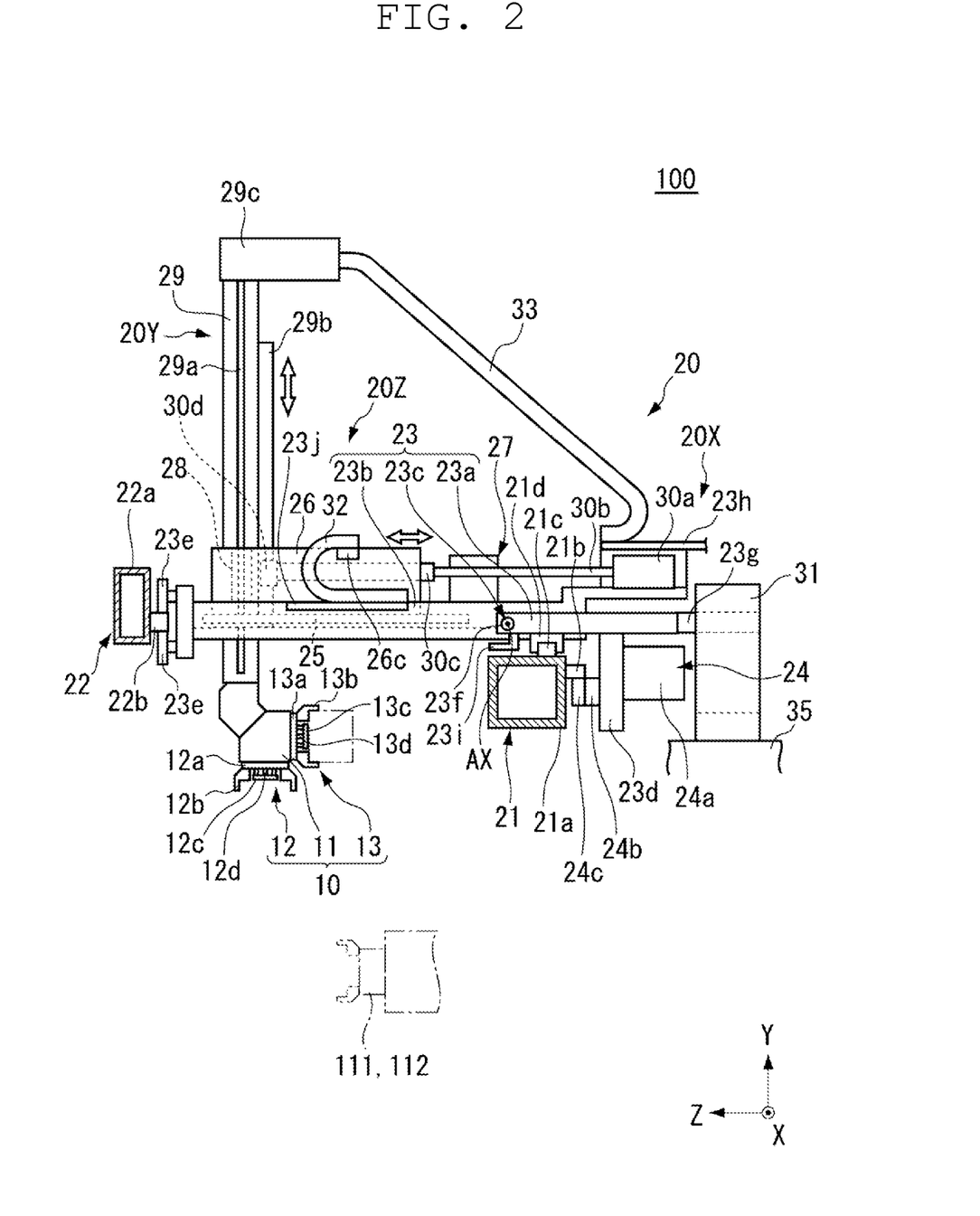
FIG. 2 is a side sectional view illustrating an example of the workpiece conveyor according to the first preferred embodiment of the present invention.
Figure 3:
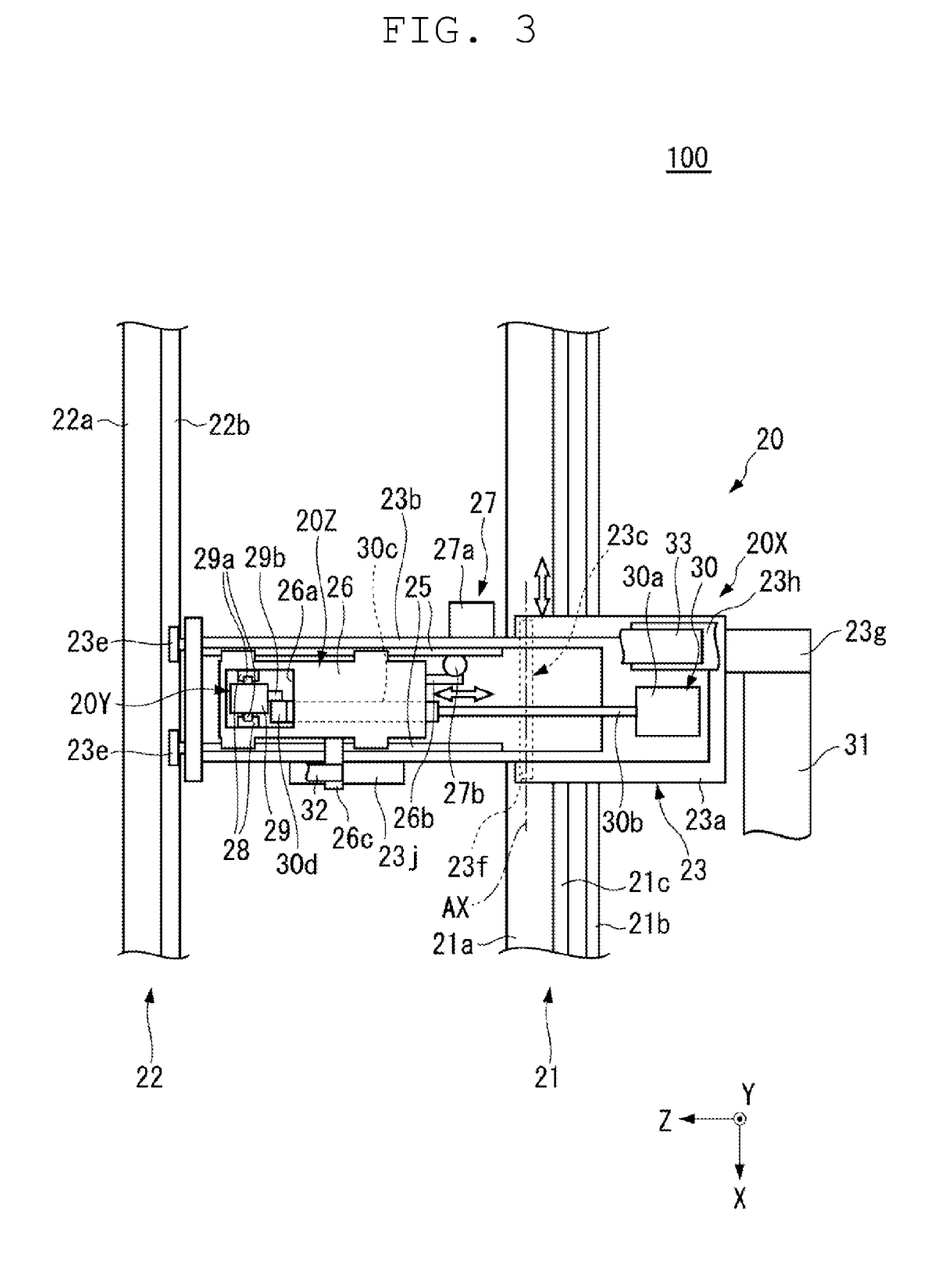
FIG. 3 is a plan view illustrating an example of the workpiece conveyor according to the first preferred embodiment of the present invention.

FIG. 1 is a perspective view illustrating an example of a workpiece conveyor 100 according to a first preferred embodiment of the present invention. FIG. 2 is a side view illustrating an example of the workpiece conveyor 100. FIG. 3 is a plan view illustrating an example of the workpiece conveyor 100. However, to clarify the configuration of the workpiece conveyor 100, in FIGS. 1 to 3, a portion of the workpiece conveyor 100 is illustrated in cross section or omitted.

As illustrated in FIGS. 1 to 3, the workpiece conveyor 100 includes a workpiece holder 10 and a moving mechanism 20. The workpiece conveyor 100 is mounted on a machine tool for use, and conveys a workpiece W between spindles 111, 112 (indicated by alternate long and short dash lines in FIG. 2) provided in the machine tool and a workpiece loading/unloader (not illustrated).

As illustrated in FIG. 2, the workpiece holder 10 includes a loader head 11. The loader head 11 includes chucks 12, 13 that grip the workpiece W. One of the chucks 12, 13 is disposed so as to face the spindle 111 (oriented in the −Z direction), and the other is disposed so as to face the floor surface (oriented in the −Y direction).

The loader head 11 is provided with a rotating mechanism (not illustrated) that exchanges the positions of the two chucks 12, 13. The rotating mechanism is rotatable about an axis inclined relative to the Y axis by a predetermined angle (e.g., 45 degrees). The rotating mechanism exchanges the positions of the two chucks 12, 13. As illustrated in FIG. 2, the chucks 12, 13 include base members 12a, 13a, chuck jaws 12b, 13b, pusher plates 12c, 13c, and elastic members 12d, 13d, respectively.

The base members 12a, 13a support the chuck jaws 12b, 13b and the elastic members 12d, 13d, respectively. The plurality of chuck jaws 12b, 13b are arranged at predetermined intervals on the peripheries of the chucks 12, 13, respectively. The chuck jaws 12b, 13b are movable in the radial direction of the chucks 12, 13 to hold the workpiece W. A driver that moves the chuck jaws 12b, 13b is provided, for example, in the loader head 11.

The pusher plates 12c, 13c press an end surface of the workpiece W. The pusher plates 12c, 13c preferably have a triple arm shape so as not to interfere with the chuck jaws 12b, 13b, respectively. The pusher plates 12c, 13c are supported by the elastic members 12d, 13d, respectively. When the gripping of the chuck jaws 12b, 13b is released, the elastic members 12d, 13d pushes out the workpiece W via the pusher plates 12c, 13c.

The moving mechanism 20 moves the workpiece holder 10. The moving mechanism 20 includes an X moving mechanism 20X, a Z moving mechanism 20Z, and a Y moving mechanism 20Y.

The X moving mechanism 20X includes a first guide 21, a second guide 22, a movable body 23, and a driver 24.

The first guide 21 and the second guide 22 guide the movable body 23. The first guide 21 and the second guide 22 extend longitudinally in the X direction, and are spaced apart from each other in the Z direction. The first guide 21 and the second guide 22 are parallel or substantially parallel to each other in the X direction.

The first guide 21 includes a frame 21a, a rack 21b, a rail 21c, and a block 21d. The first guide 21 has a higher strength than the second guide 22, to be described below.

The frame 21a extends in the X direction, and is fixed to a fixing section (not illustrated). The frame 21a is preferably hollow, for example, but may be solid. The frame 21a is preferably rectangular or substantially rectangular when viewed in the X direction, for example, but the present invention is not limited thereto, and the frame 21a may have any other shape such as circular or triangular.

The rack 21b is disposed on a −Z side surface of the frame 21a, and extends linearly in the X direction. On a −Y side surface of the rack 21b, a plurality of teeth are provided. The plurality of teeth are arranged at predetermined pitches in the X direction.

The rail 21c and the block 21d constitute, for example, a linear guide. The rail 21c is disposed on an upper surface (+Y side surface) of the frame 21a, and extends linearly in the X direction. The block 21d is attached to an upper portion of the rail 21c, and is movable along the rail 21c in the X direction.

The second guide 22 includes a frame 22a and a protruding piece 22b. Similarly to the frame 21a of the first guide 21, the frame 22a is preferably hollow, for example, but may be solid. The frame 22a is preferably rectangular or substantially rectangular when viewed in the X direction, for example, but the present invention is not limited thereto, and the frame 22a may have any other shape such as circular or triangular.

The frame 22a is disposed above (+Y side position) the frame 21a of the first guide 21. The frame 22a is provided with the protruding piece 22b. The protruding piece 22b is disposed on the −Z side surface of the frame 22a, and is provided on substantially the entire −Z side surface in the X direction. The protruding piece 22b protrudes toward the first guide 21 in the −Z direction.

The movable body 23 extends between the first guide 21 and the second guide 22. The movable body 23 includes a first structure 23a, a second structure 23b, and a joint 23c.

The first structure 23a is connected to an upper surface of the block 21d of the first guide 21. Accordingly, the block 21d moves along the rail 21c so that the first structure 23a moves in the X direction integrally with the block 21d. In this manner, the first structure 23a is guided by the first guide 21.

The +Z side end of the first structure 23a is coupled to the second structure 23b via the joint 23c. The first structure 23a includes a driver support 23d protruding in the −Y direction. The driver support 23d is preferably formed integrally with the first structure 23a, and supports the driver 24, to be described later.

The second structure 23b includes a bottom disposed along the XZ plane and walls disposed along the +X side and the −X side. Rollers 23e are provided at a +Z side end of the second structure 23b. The pair of rollers 23e sandwich the protruding piece 22b therebetween in the Y direction. An elevator 29 rises and falls in the Y direction. With the pair of rollers 23e sandwiching the protruding piece 22b in the Y direction, loads caused by movement of the elevator 29 are supported in both of the +Y direction and the −Y direction. The rollers 23e are provided so as to roll on the respective upper and lower surfaces of the protruding piece 22b in the X direction. In this manner, the second structure 23b is guided to the second guide 22 via the rollers 23e. The protruding piece 22b is not limited to a plate shape, and may be cylindrical, for example. In the case of the cylindrical protruding piece 22b, a roller including a concave surface is brought into contact with the protruding piece 22b. The roller may be disposed on the frame 22a.

The joint 23c preferably is tubular, or has a tubular coupling member 23f. The coupling member 23f is disposed parallel or substantially parallel to the X direction. The coupling member 23f couples the first structure 23a and the second structure 23b such that the structures are able to swing about an axis of a central shaft AX. Consequently, the central shaft AX of the coupling member 23f defines and functions as a swing shaft about which the first structure 23a and the second structure 23b swing. Hereinafter, such a shaft will be referred to as a swing shaft AX.

The swing shaft AX is set parallel or substantially parallel to the X direction. In the joint 23c, one of the first structure 23a and the second structure 23b is able to swing about the axis of the swing shaft AX with respect to the other of the first structure 23a and the second structure 23b. In this present preferred embodiment, as described below, the first structure 23a is supported by the +Y side surface and the −Z side surface of the frame 21a and thus, is restricted from rotating about the axis parallel or substantially parallel to the X direction (axis of the swing shaft AX). The second structure 23b is disposed such that it can swing about the axis of the swing shaft AX. In this case, the swing shaft AX is disposed such that a distance to the first guide 21 is smaller than a distance to the second guide 22. With this configuration, when the +Z side end of the second structure 23b is displaced in the Y direction, a change of a swing angle is suppressed, thus enabling stable movement of the movable body 23. As illustrated in FIG. 2, the −Y side surface of the first structure 23a is provided with a stopper 23i. The stopper 23i restricts the rotation by locking the second structure 23b such that the second structure 23b does not rotate by a predetermined angle or more, for example, at the time of assembly.

The driver 24 includes a driving source 24a, a transmission mechanism 24b, and a pinion 24c. The driving source 24a is supported by the driver support 23d of the first structure 23a. Examples of the driving source 24a include a motor device. The driving source 24a rotates an output shaft (not illustrated) about the Z axis. The transmission mechanism 24b is coupled to the above-mentioned output shaft, and transmits rotation caused in the driving source 24a to the pinion 24c. The pinion 24c rotates about the Z axis, and includes a plurality of teeth arranged in a peripheral direction. The teeth of the pinion 24c are arranged to engage with the teeth of the rack 21b. The rotational force generated in the driving source 24a is transmitted to the pinion 24c via the transmission mechanism 24b to rotate the pinion 24c. Because the rack 21b (frame 21a) side is fixed, the pinion 24c moves in the X direction with respect to the rack 21b integrally with the driver support 23d and the first structure 23a. The first structure 23a is connected to the block 21d on the +Y side of the frame 21a and to the rack 21b on the −Z side of the frame 21a, thus being restricted from rotating about the axis parallel or substantially parallel to the X direction.

The Z moving mechanism 20Z includes guides 25, a slider 26, and a driver 27. The guides 25 are provided on the +X side wall and the −X side wall of the second structure 23b. The guides 25 each extend in the Z direction. The guides 25 guide the slider 26. The slider 26 preferably has a rectangular or substantially parallelepiped shape. The slider 26 has a through hole 26a penetrating the elevator 29. The slider 26 is provided with a rack 26b. The rack 26b extends linearly in the Z direction, and includes a plurality of teeth on its −X side surface. The plurality of teeth are arranged in the Z direction.

The driver 27 includes a driving source 27a and a pinion 27b. The driving source 27a is supported by the −X side wall of the second structure 23b. Examples of the driving source 27a include a motor. The driving source 27a transmits the rotational force about the Y axis to the pinion 27b via a transmission mechanism (not illustrated). The pinion 27b is attached to the second structure 23b so as to be rotatable about the Y axis. The pinion 27b includes a plurality of teeth arranged in the peripheral direction. The teeth of the pinion 27b are arranged to engage with the teeth of the rack 26b. The rotational force generated in the driving source 27a is transmitted to the pinion 27b via a transmission mechanism (not illustrated) to rotate the pinion 27b. Since the pinion 27b is attached to the second structure 23b, due to the rotation of the pinion 27b, the rack 26b is driven in the Z direction with respect to the pinion 27b. Thus, the slider 26 moves along the guides 25 in the Z direction.

The Y moving mechanism 20Y includes guides 28, the elevator 29, and a driver 30. The guides 28 guide the elevator 29. The guides 28 are provided on the +X side inner wall and the −X side inner wall of the through hole 26a. The guides 28 each extend parallel or substantially parallel to the Y direction. The guides 28 include grooves extending linearly in the Y direction.

The elevator 29 preferably is a bar-shaped. Protruding pieces 29a are provided on the +X side surface and the −X side surface of the elevator 29. The protruding pieces 29a extend linearly in the Y direction. The protruding pieces 29a are inserted into the respective grooves of the guides 28. Accordingly, the elevator 29 is guided by the guides 28 in the Y direction with the protruding pieces 29a inserted into the grooves of the guides 28. The elevator 29 is provided with a rack 29b. The rack 29b extends linearly in the Y direction, and includes a plurality of teeth on its +X side surface. The plurality of teeth are arranged in the Y direction. The workpiece holder 10 is fixed to the −Y side end of the elevator 29.

The driver 30 includes a driving source 30a, an output shaft 30b, a spline 30c, and a pinion 30d. The driving source 30a is supported by the upper surface (+Y side surface) of the first structure 23a. Since the driving source 30a is supported by the first structure 23a instead of the slider 26, the weight of the slider 26 is able to be reduced. Note that the driving source 30a may be supported by the slider 26. Examples of the driving source 30a include a motor. The driving source 30a transmits the rotational force about the Z axis to the pinion 30d via the output shaft 30b and the spline 30c. A groove extending in the Z direction is located on an outer periphery of the output shaft 30b. A groove is located on an inner periphery of the spline 30c to engage with the groove on the outer periphery of the output shaft 30b. The spline 30c is fixed to the slider 26, and is movable in the Z direction integrally with the slider 26.

The pinion 30d is fixed to the +Z side end of the spline 30c, and includes a plurality of teeth arranged in the peripheral direction. The teeth of the pinion 30d are disposed to engage with the teeth of the rack 29b. The rotational force generated in the driving source 30a is transmitted to the pinion 30d via the output shaft 30b and the spline 30c to rotate the pinion 30d about the Z axis. Because the pinion 30d is fixed to the slider 26, due to the rotation of the pinion 30d, the rack 29b is driven in the Y direction with respect to the pinion 30d. As a result, the elevator 29 moves along the guides 28 in the Y direction.

Protective guides 31 to 33 accommodate various cables including power feeding cables for the chucks 12, 13. As illustrated in FIG. 2, one end of the protective guide 31 is fixed to a fixing section 35 provided at a predetermined position. The other end of the protective guide 31 is fixed to an attaching section 23g provided at the −Z side end of the first structure 23a. One end of the protective guide 32 is fixed to an attaching section 23j of the second structure 23b. The other end of the protective guide 32 is fixed to an attaching section 26c of the slider 26. One end of the protective guide 33 is fixed to an attaching section 23h provided at the −Z side end of the second structure 23b. The other end of the protective guide 33 is fixed to an attaching section 29c provided at the +Y side end of the elevator 29.

When the workpiece holder 10 is moved in the X direction in the workpiece conveyor 100 thus configured, the X moving mechanism 20X moves the movable body 23 in the X direction. At this time, the slider 26 and the elevator 29 move in the X direction integrally with the movable body 23. In this case, relative movement between the movable body 23, the slider 26, and the elevator 29 does not occur.

When the workpiece holder 10 is moved in the Z direction, the Z moving mechanism 20Z moves the slider 26 in the Z direction. At this time, the elevator 29 moves in the Z direction integrally with the slider 26, but the movable body 23 does not move. Accordingly, due to the movement of the slider 26, the elevator 29 moves in the Z direction with respect to the movable body 23. In this preferred embodiment, the driving source 30a of the elevator 29 is supported by the first structure 23a, thus reducing a load on the driver 27 during the movement of the slider 26.

When the workpiece holder 10 is moved in the Y direction, the Y moving mechanism 20Y moves the elevator 29 in the Y direction. At this time, the movable body 23 and the slider 26 do not move. Consequently, due to the movement of the elevator 29, the elevator 29 moves in the Y direction with respect to both of the movable body 23 and the slider 26.

In this preferred embodiment, since the X moving mechanism 20X includes the two guides, i.e., the first guide 21 and the second guide 22, the movable body 23 extends between the first guide 21 and the second guide 22. For example, in the case where the first guide 21 is different from the second guide 22 in height (position in the Y direction) or distance therebetween depending on places, in the configuration in which the movable body merely extends between the two guides, loads may be exerted on the first guide 21, the second guide 22, and the movable body itself with the movement of the movable body. This disadvantageously obstructs smooth movement of the movable body as well as shortens the life of the first guide 21 and the second guide 22. Although the first guide 21 and the second guide 22 can be positioned with high accuracy, bending of the frame 21a, 22a and the like need to be considered, which requires an excessive workload during installation.

On the contrary, in this preferred embodiment, the movable body 23 includes the first structure 23a, the second structure 23b, and the joint 23c, and at the joint 23c, the second structure 23b is able to swing about the axis of the swing shaft AX with respect to the first structure 23a. For this reason, when the movable body 23 moves in the X direction, at the joint 23c, the second structure 23b swings about the axis of the swing shaft AX so as to follow the first guide 21 and the second guide 22.

Figure 4A:
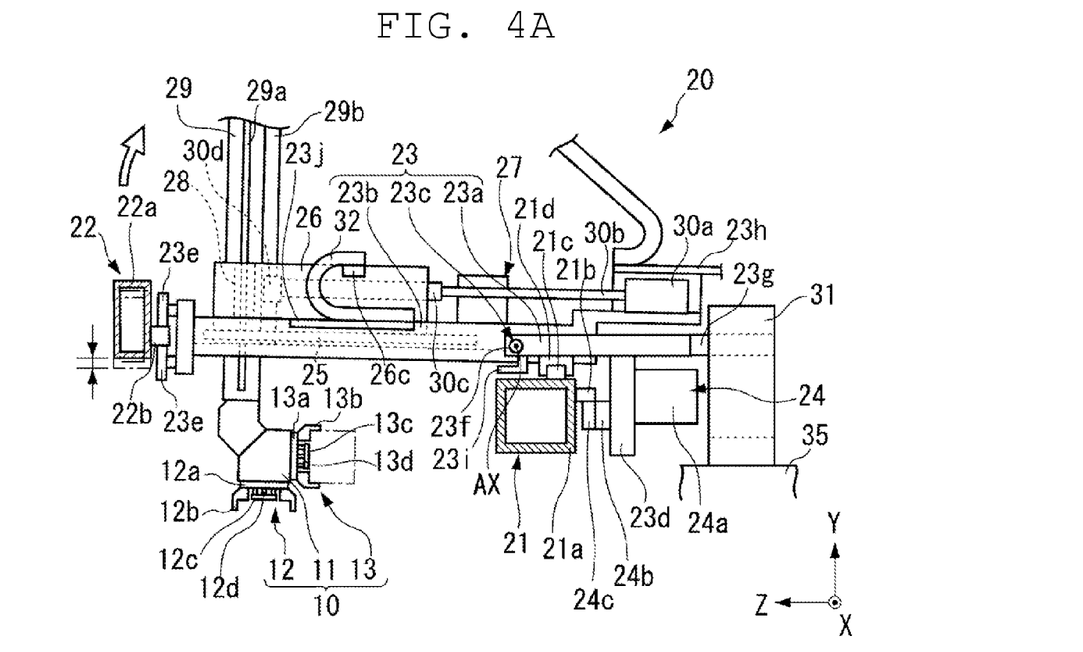
FIGS. 4A and 4B are side views each illustrating an example of an operation of the workpiece conveyor.

For example, when the second guide 22 is located on the +Y side with respect to the first guide 21 as illustrated in FIG. 4A, the second structure 23b swings about the axis of the swing shaft AX such that its +Z side end is inclined toward the +Y side. The first structure 23a does not swing about the axis of the swing shaft AX. In this case, a load on mainly the first guide 21 (for example, a rail 21*c*) is reduced.

Figure 4B:
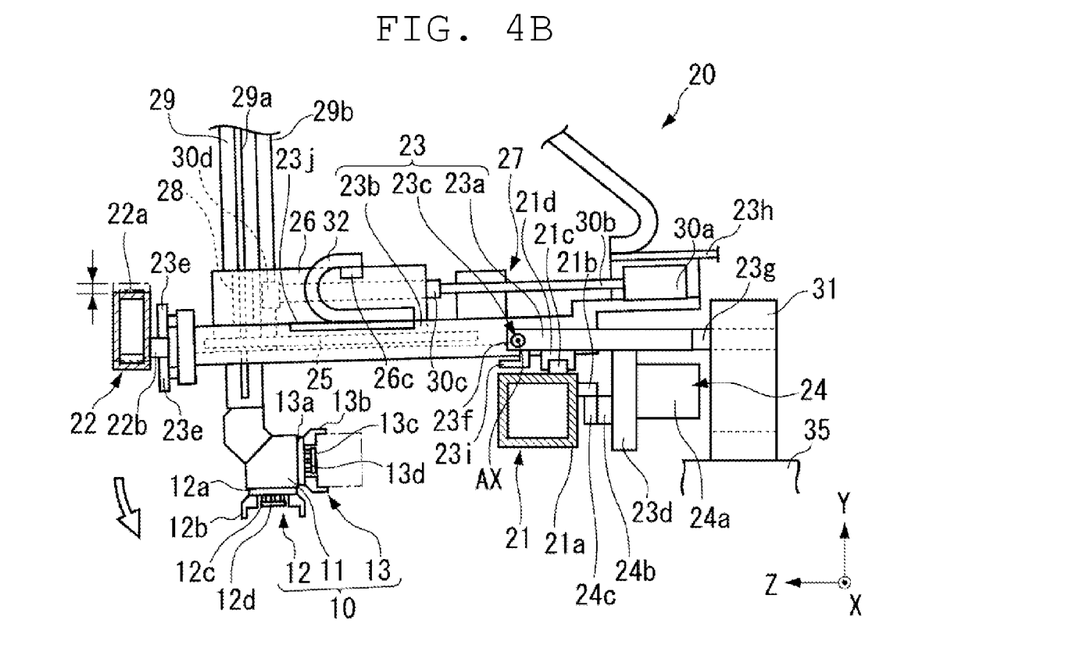

For example, when the second guide 22 is located on the −Y side with respect to the first guide 21 as illustrated in FIG. 4B, the second structure 23*b* swings about the axis of the swing shaft AX such that its +Z side end is inclined toward the −Y side. The first structure 23*a* does not swing about the axis of the swing shaft AX. Also in this case, a load on mainly the first guide 21 (for example, the rail 21*c*) is reduced. Note that the actual swinging of the second structure 23*b* includes a minute swinging that cannot be visually recognized. In FIGS. 4A and 4B, to clarify the swinging of the second structure 23*b*, the swinging is exaggerated than the actual swinging.

Figure 5:
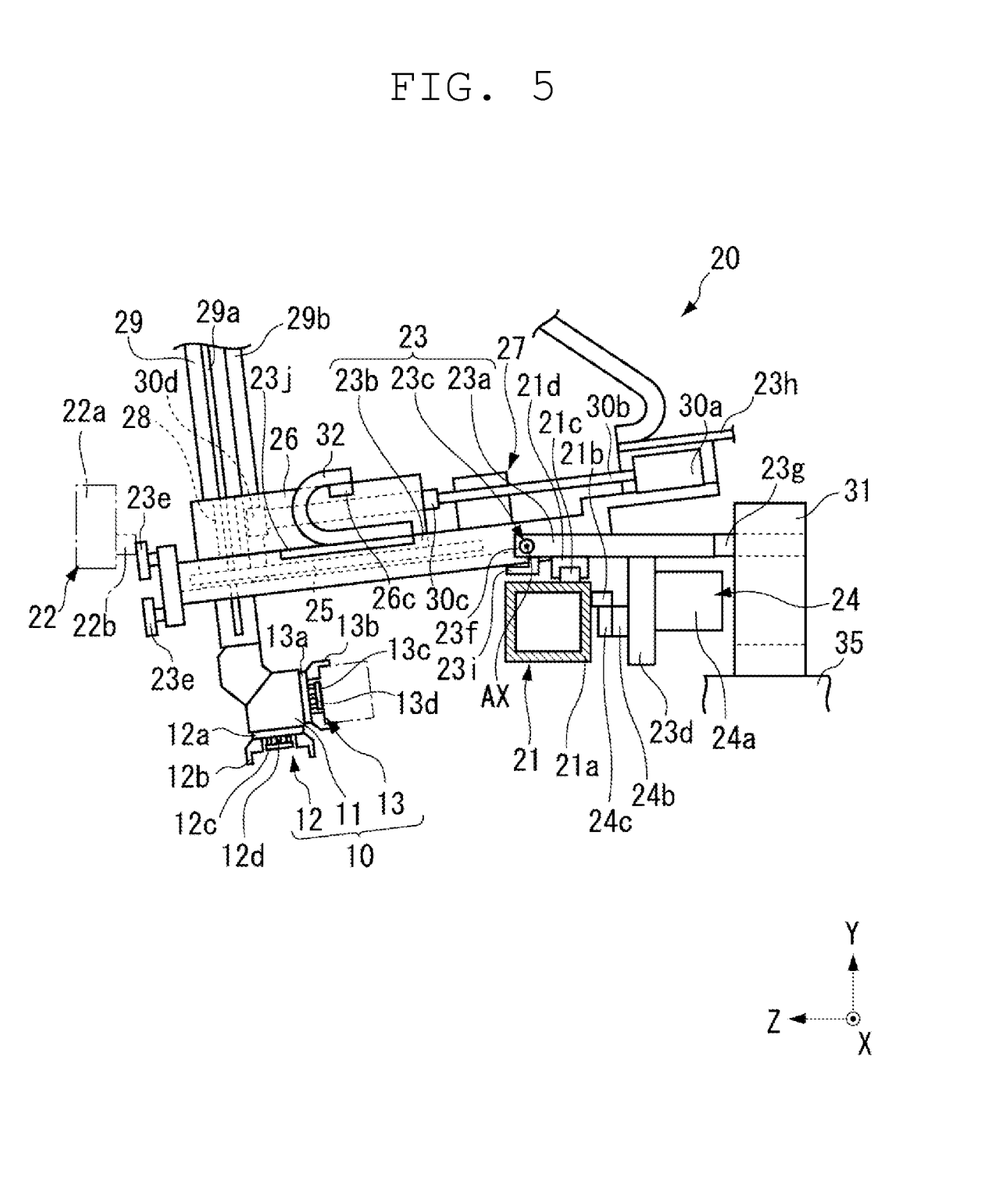
FIG. 5 is a side view illustrating an example of the workpiece conveyor.

As illustrated in FIG. 5, when the second structure 23*b* rotates by a predetermined angle or more, for example, at the time of assembly, the stopper 23*i* on the −Y side surface of the first structure 23*a* locks the −Y side surface of the second structure 23*b*. This restricts rotation of the second structure 23*b*. Although FIG. 5 shows the example of the case where the +Z side of the second structure 23*b* preferably is inclined toward the −Y side, the present invention is not limited thereto, and a similar stopper may be provided also in the case where the +Z side of the second structure 23*b* is inclined toward the +Y side.

Although not illustrated, in the configuration in which, at the joint 23*c*, the first structure 23*a* swings about the axis of the swing shaft AX, and the second structure 23*b* does not swing about the axis of the swing shaft AX, the first structure 23*a* swings about the axis of the swing shaft AX such that the −Z side end of the first structure 23*a* is inclined toward the +Y side or the −Y side. In this case, a load on mainly the second guide 22 (for example, the protruding piece 22*b*) is reduced.

As described above, in this preferred embodiment, by using the two guides, i.e., the first guide 21 and the second guide 22, the weight of the movable body 23 is reduced. Since the first structure 23*a* and the second structure 23*b* swing via the joint 23*c*, loads on the movable body 23, the first guide 21, and the second guide 22 are reduced. Because the loads on the first guide 21 and the second guide 22 are reduced by the swinging of the first structure 23*a* and the second structure 23*b*, it is not necessary to adjust the positions of the first guide 21 and the second guide 22 with high accuracy. Thus, even when the two guides, i.e., the first guide 21 and the second guide 22 are used, it is possible to ensure smooth movement of the movable body 23, prevent a decrease in the life of the first guide 21 and the second guide 22, and further, reduce loads on the first guide 21 and the second guide 22 at installation.

Second Preferred Embodiment

Next, a second preferred embodiment of the present invention will be described. In the second preferred embodiment, a machine tool including the workpiece conveyor 100 in the first preferred embodiment will be described by way of example. The second preferred embodiment uses the same XYZ perpendicular or substantially perpendicular coordinate system as in the first preferred embodiment. However, in the second preferred embodiment, the rotary axis direction of the spindles 111, 112 is defined as the Z direction, and the direction of defining the cut amount of the workpiece W is defined as the X direction.

Figure 6A:
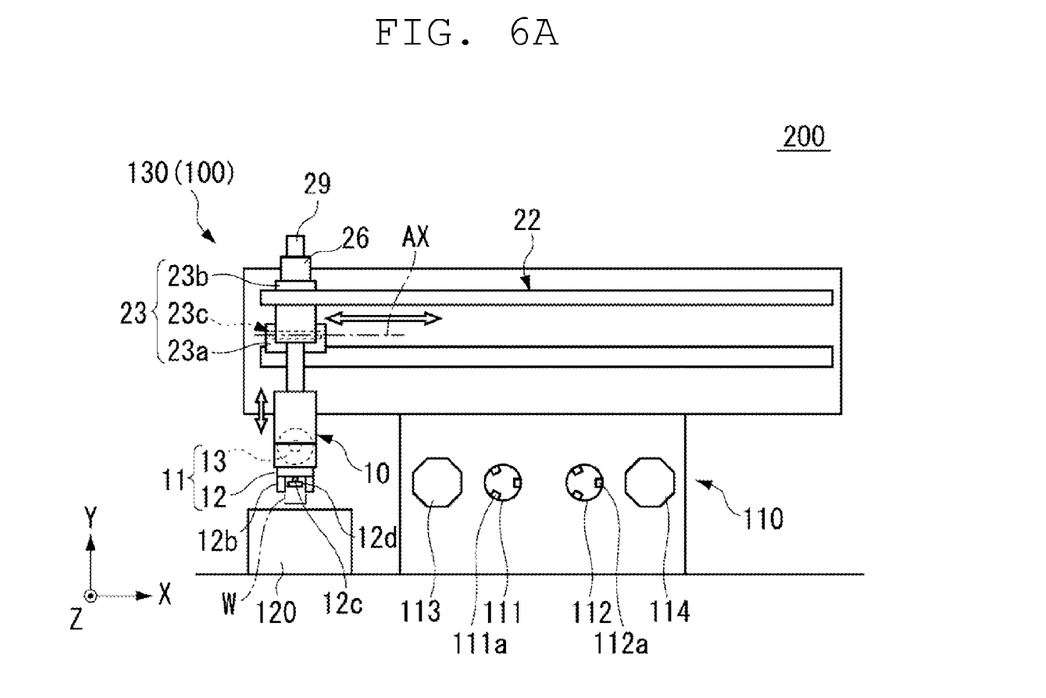
FIGS. 6A and 6B are perspective views illustrating an example of a machine tool according to a second preferred embodiment of the present invention.
Figure 6B:
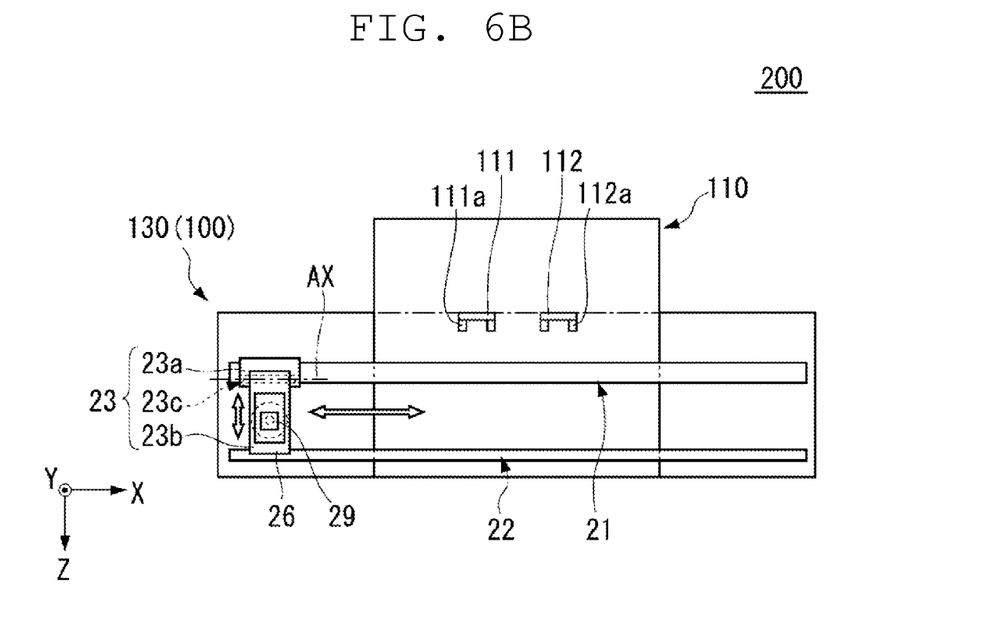

FIGS. 6A and 6B illustrate an example of a machine tool 200 according to the second preferred embodiment. The machine tool 200 illustrated in FIGS. 6A and 6B preferably is a parallel biaxial lathe, for example. In FIGS. 6A and 6B, the +Z side of the machine tool 200 is a front surface, and the −Z side is a back surface. The ±X sides of the machine tool 200 are side surfaces, and the X direction is a lateral direction of the machine tool 200.

The machine tool 200 includes a body 110 and a workpiece loader 120.

The body 110 includes spindles 111, 112 and turrets 113, 114. The spindles 111, 112 are arranged in the X direction. The spindles 111, 112 are rotatably supported by respective bearings (not illustrated). The spindles 111, 112 are provided with chuck jaws 111*a*, 112*a*, respectively, on their +Z side ends. The plurality of chuck jaws 111*a*, 112*a* are arranged at predetermined intervals around the rotary axes of the spindles 111, 112, respectively. The chuck jaws 111*a*, 112*a* are movable in the radial direction of the spindles 111, 112 to hold the workpiece W.

The turret 113 is disposed on the +X side of the spindle 111. The turret 114 is disposed on the −X side of the spindle 112. Each of the turrets 113, 114 is provided with a rotational driver such as a motor. The rotational driving devices enable the turrets 113, 114 to rotate about the axis parallel or substantially parallel to the Z direction. A plurality of holders (not illustrated) to hold a cutting tool are provided on the periphery of each of the turrets 113, 114. All or part of the holders hold the cutting tool. Thus, a desired cutting tool is selected by rotating the turrets 113, 114. The cutting tools held by the holders of the turrets 113, 114 are able to be exchanged for each holding table. Examples of the cutting tools include a bit that cuts the workpiece W and rotational tools such as a drill and an end mill. The turrets 113, 114 are movable in the X direction and the Z direction via a driver (not illustrated). As a result, the cutting tool is movable in the X direction and the Z direction with respect to the workpiece W.

The workpiece W to be processed using the machine tool 200 is placed on the workpiece loader 120. The workpiece loader 120 includes, for example, a fixing table, but is not limited thereto, and may include a conveyor or a rotary table.

Like the machine tool 200 illustrated in FIGS. 6A and 6B, some machine tools include a workpiece conveyor 130. In this case, the workpiece conveyor 100 in the first preferred embodiment is used as the workpiece conveyor 130. In the workpiece conveyor 130, the two guides, i.e., the first guide 21 and the second guide 22 stretch over the body 110 and the workpiece loader 120 in the X direction such that the workpiece holder 10 is able to move between the spindles 111, 112 and the workpiece loader 120. Thus, in the workpiece conveyor 130, the movable body 23 moves in the X direction, so that the workpiece W is conveyed between the spindles 111, 112 and the workpiece loader 120.

The movable body 23 extends between the first guide 21 and the second guide 22. The movable body 23 includes the first structure 23*a*, the second structure 23*b*, and the joint 23*c*, and at the joint 23*c*, the second structure 23*b* is able to swing about the axis of the swing shaft AX with respect to the first structure 23*a*.

Next, the operation of the machine tool 200 thus configured will be described.

First, the workpiece conveyor 130 disposes the workpiece holder 10 above (+Y side) the workpiece loader 120. Thereafter, as illustrated in FIG. 6A, the elevator 29 is moved in the −Y direction with the chuck 12 of the loader head 11 facing the lower side (−Y direction), and the workpiece W is gripped by the chuck jaw 12*b*.

Thereafter, the chuck 12 and the chuck 13 are exchanged by a rotating mechanism (not illustrated). As a result, the chuck 12 and the workpiece W are oriented to the −Z side, and the chuck 13 is oriented to the −Y side. After the chuck 12 is oriented to the −Z side, the elevator 29 is moved in the +Y direction to pull up the workpiece W.

Next, the X moving mechanism 20X moves the movable body 23 in the +X direction, so that the loader head 11 and the workpiece W are disposed above (+Y side) the spindle 111. The case where the workpiece W is disposed at the spindle 111 will be described below by way of example. In the case where the workpiece W is disposed at the spindle 112, the loader head 11 and the workpiece W are disposed above the spindle 112.

When the movable body 23 moves in the X direction, similarly to the first preferred embodiment, at the joint 23c, the second structure 23b swings about the axis of the swing shaft AX so as to follow the first guide 21 and the second guide 22. At this time, the first structure 23a does not swing about the axis of the swing shaft AX. In this case, a load on mainly the first guide 21 is reduced.

Next, the Y moving mechanism 20Y moves the elevator 29 in the −Y direction to cause the workpiece W to face the spindle 111. Then, the Z moving mechanism 20Z moves the slider 26 in the −Z direction so that the workpiece W is held by the chuck jaw 111a of the spindle 111. Thereafter, the loader head 11 is moved in the +Z direction and the +Y direction. Then, the workpiece W is processed according to a predetermined processing recipe by using a tool (not illustrated) provided in the turret 114.

Figure 7:
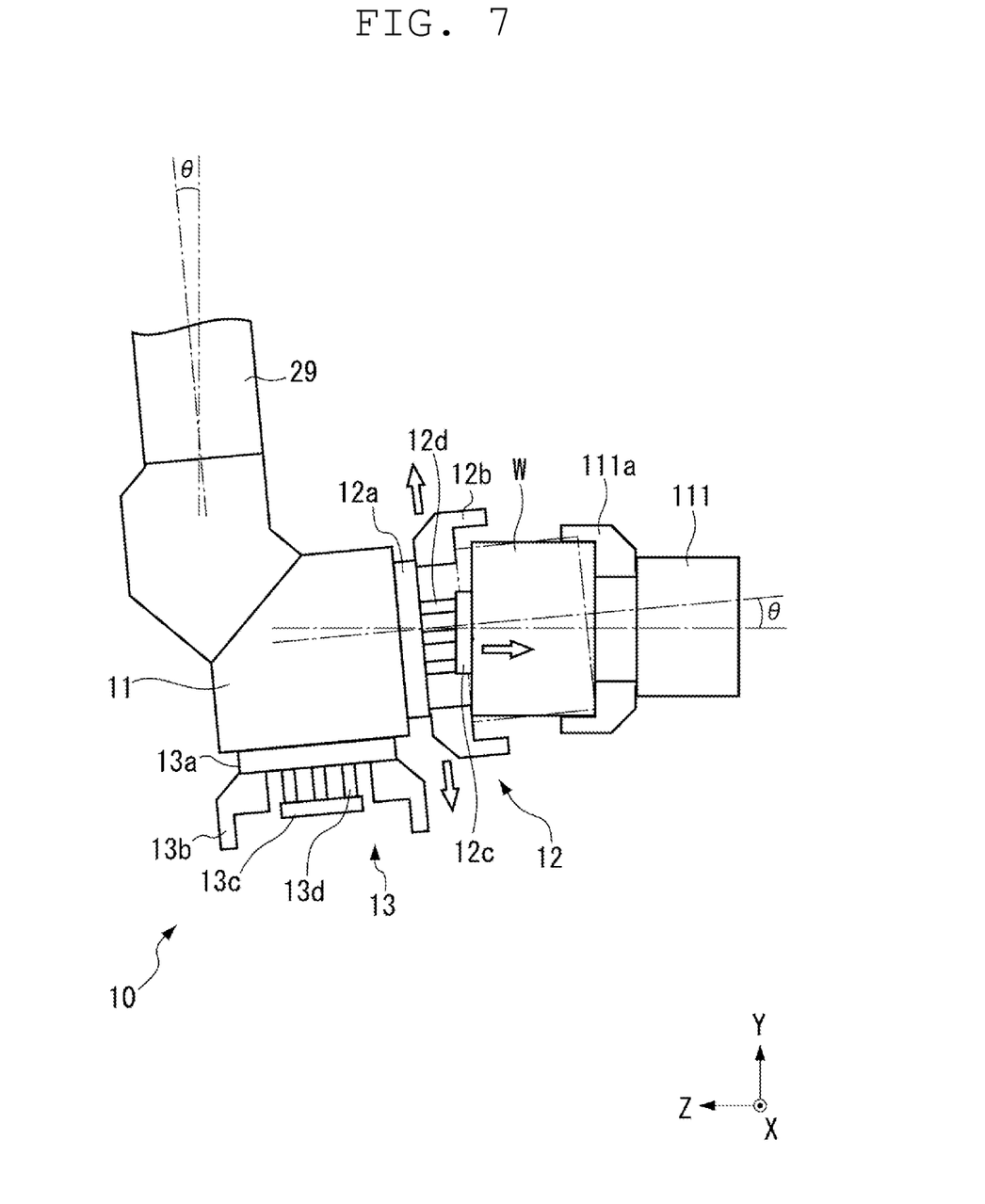
FIG. 7 is a side view illustrating an example of an operation of the workpiece conveyor according to the second preferred embodiment of the present invention.

When the second structure 23b swings by an angle θ with the movement of the movable body 23 in the X direction, as illustrated in FIG. 7, the elevator 29 swings, and the loader head 11 fixed to the −Y side end of the elevator 29 is inclined with the angle θ. In this case, the orientation of the workpiece W held by the chuck 12 is shifted from the spindle 111 by the angle θ.

On the contrary, in this preferred embodiment, when the gripping of the workpiece W by the chuck jaw 12b is released, the workpiece W is pushed out toward the −Z side with the elastic member 12d and the pusher plate 12c. At this time, the workpiece W is pushed to the −Z side with respect to the spindle 111, and the −Z side end surface of the workpiece W comes into contact with the holding surface (parallel or substantially parallel to the XY plane) of the spindle 111. Accordingly, the orientation of the workpiece W is corrected such that the end surface of the workpiece W becomes parallel or substantially parallel to the XY plane.

As described above, according to the second preferred embodiment, the workpiece conveyor 100 that prevents a decrease in the life of the first guide 21 and the second guide 22, and reduces a workload of assembly is used as the workpiece conveyor 130, such that the accuracy of conveying the workpiece W is stabilized and the machine tool 200 that is able to be manufactured at low cost is obtained.

The preferred embodiments have been described above, but the present invention is not limited to the above description, and various changes can be made within the scope not deviating from the gist of the present invention.

For example, in the above preferred embodiments, the workpiece conveyor 100 preferably conveys the workpiece W between the workpiece loader 120 to load the workpiece W and the spindles 111, 112, but the present invention is not limited thereto. For example, in the case where a workpiece unloader to unload the workpiece W is separately provided, the workpiece conveyor 100 may convey the workpiece W between the spindles 111, 112 and the workpiece unloader.

In the second preferred embodiment, the configuration in which one set of the workpiece holder 10 and the moving mechanism 20 of the workpiece conveyor 130 is provided has been described by way of example, but the present invention is not limited thereto, and multiple sets of the workpiece holders 10 and the moving mechanisms 20 may be provided. In this case, the plurality of moving mechanisms 20 may share the first guide 21 and the second guide 22.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A workpiece conveyor comprising:
   a chuck that holds a workpiece;
   first and second guides disposed in parallel or substantially parallel and spaced apart from each other; and
   a movable body that supports the chuck and is movable in a first direction along the first guide and the second guide; wherein
   the movable body includes a first structure that is guided by and contacts the first guide, a second structure that is guided by and contacts the second guide, and a joint that is provided between the first structure and the second structure, and allows one of the first structure that contacts the first guide and the second structure that contacts the second guide to swing with respect to the other about an axis of a swing shaft, the axis of the swing shaft being parallel or substantially parallel to the first direction.

2. The workpiece conveyor according to claim 1, wherein
   the first structure is guided in the first direction by the first guide while being restricted from rotating about an axis parallel or substantially parallel to the first direction; and
   the second structure is swingable about the axis of the swing shaft with respect to the first structure.

3. The workpiece conveyor according to claim 2, wherein the first structure includes a driver that moves in the first direction.

4. The workpiece conveyor according to claim 2, wherein
   the second guide includes a protruding piece that extends over a whole length of the second guide and protrudes toward the first guide; and
   the second structure includes a pair of rollers that sandwich the protruding piece.

5. The workpiece conveyor according to claim 2, wherein the swing shaft of the joint is disposed such that a distance to the first guide is smaller than a distance to the second guide.

6. The workpiece conveyor according to claim 1, wherein
   the first direction extends along a horizontal plane;
   the second structure includes a slider that moves in a second direction, the second direction crossing the first direction and extending along the horizontal plane, and an elevator that is supported by the slider and is movable in a third direction vertical to the horizontal plane; and
   the chuck is disposed below the elevator.

7. The workpiece conveyor according to claim 6, wherein the first guide has a higher load strength than the second guide.

8. The workpiece conveyor according to claim 1, wherein the chuck includes a chuck jaw that grips the workpiece, and an elastic member that pushes out the workpiece when the gripping by the chuck jaw is released.

9. A machine tool comprising the workpiece conveyor according to claim 1.

* * * * *